(12) United States Patent
Fox

(10) Patent No.: US 6,191,587 B1
(45) Date of Patent: Feb. 20, 2001

(54) SATELLITE SYNCHRONIZED 3-D MAGNETOTELLURIC SYSTEM

(76) Inventor: Anthony Charles Leonid Fox, 10 Hillcrest Drive, Toronto, Ontario (CA), M6G 2C9

(*) Notice: Under 35 U.S.C. 154(b), the term of this patent shall be extended for 0 days.

(21) Appl. No.: 09/147,112

(22) PCT Filed: Apr. 25, 1997

(86) PCT No.: PCT/CA97/00274

§ 371 Date: Apr. 26, 1999

§ 102(e) Date: Apr. 26, 1999

(87) PCT Pub. No.: WO97/41457

PCT Pub. Date: Nov. 6, 1997

Related U.S. Application Data

(60) Provisional application No. 60/017,043, filed on Apr. 26, 1996.

(51) Int. Cl.[7] .................. G01V 3/00; G01V 3/08
(52) U.S. Cl. .................. 324/350; 324/345; 342/357.06; 701/213; 702/5
(58) Field of Search .................. 324/345, 348–350; 702/5; 342/357.06; 701/213

(56) References Cited

U.S. PATENT DOCUMENTS

| | | | | |
|---|---|---|---|---|
| 2,240,520 | * | 5/1941 | Schlumberger | 324/349 |
| 2,677,801 | * | 5/1954 | Cagniard | 324/350 |
| 4,210,869 | * | 7/1980 | Groenendyke et al. | 324/350 X |
| 5,043,667 | * | 8/1991 | Schofield | 324/350 |
| 5,319,374 | * | 6/1994 | Desai et al. | |
| 5,629,626 | * | 5/1997 | Russell et al. | 324/345 |
| 5,719,500 | * | 2/1998 | Eschner et al. | 324/329 |
| 5,770,945 | * | 6/1998 | Constable | 324/350 |

FOREIGN PATENT DOCUMENTS

0577364 * 1/1994 (EP) .

OTHER PUBLICATIONS

Towle et al.; A Digital Recording Field System for Geomagnetic–Telluric Array Studies, IEEE Transactions on Geoscience Electronics, vol. 17, No. 2, pp. 41–45, Apr. 1979.*

Orange, Arnold S., Magnetotelluric Exploration for Hydrocarbons, Procedings of the IEEE, vol. 77, No. 2, pp. 287–317, Feb. 1989.*

* cited by examiner

*Primary Examiner*—Gerard Strecker
(74) *Attorney, Agent, or Firm*—Gowling Lafleur Henderson LLP

(57) ABSTRACT

A method of data acquisition for geophysical surveys. The method includes the steps of providing a least one magnetic sensor unit for sensing and recording magnetic field fluctuations; providing a plurality of electric sensor units for sensing and recording electric currents induced by the magnetic field fluctuations; receiving a satellite based timing signal and responsively synchronizing and bag a position for each of the plurality of electric sensor units and the at least one magnetic sensor unit; and synchronously recording the positions, the magnetic field fluctuations and the electric currents for downloading for processing.

12 Claims, 6 Drawing Sheets

SATELLITE SYNCHRONIZED 3-D MAGNETOTELLURIC SYSTEM

This application is a 371 of PCTCA97/00274 filed Apr. 25, 1997, which claims the benefit of Provisional Application 60/017,043 filed Apr. 26, 1996.

FIELD OF INVENTION

This invention relates to an improved system for obtaining magnetotelluric geophysical data. In particular, this invention relates to obtaining magnetotelluric geophysical data using satellite signals for synchronizing sampling of the geophysical data and a system for analysing such data.

BACKGROUND OF INVENTION

Magnetotellurics

Magnetotellurics (MT) is a geophysical technique invented in the early 1950s, which utilizes naturally-occurring fluctuations of the earth's magnetic field to obtain an image of the earth's subsurface resistivity structure. The resistivity structure can be interpreted in geological terms and converted to an image showing subsurface rock types, thicknesses, structures, etc.

The fluctuations of the magnetic field arise from electric currents flowing in the earth's ionosphere. The changes in these current flows generate low-frequency electromagnetic waves, similar to radio waves, but at much lower frequencies. These waves are propagated around the earth by repeated reflections ("skips") from the surface and the ionosphere. Both surface and ionosphere are far more conductive than the resistive atmosphere in between. The atmosphere is sandwiched between two "mirrors" and thus acts as a "waveguide" or conduit for electromagnetic waves.

These electromagnetic waves have very little curvature since the waves are relatively distant from its source. The situation may be likened to the waves caused by throwing a stone into the surface of a body of water. Close to the point of entry or source, the circular wavefronts are strongly curved. But at greater and greater distances, the circular wavefront becomes less and less curved over a small distance. Taken to the limit, i.e. in "the far field", the wave front can be approximated by a straight line over short distances. When considered in three dimensions, an expanding spherical wavefront can be well approximated by a plane surface over a small region.

One advantage of MT is that the wavefront is almost always far from its source, and is a "plane wave" or equivalently is "in the far field". In practical terms, this means that the signal arriving over a significant geographical area is the same at every location in the area. Again, an analogy from everyday experience is useful: a radio signal arriving on this side of the earth from Australia is experienced as arriving nearly simultaneously, and at the same strength almost everywhere over an area of a few hundred square kilometers.

Unlike radio signals from fixed and definite sources, the MT signals arriving at a specific location can arrive from any direction. The MT signal is thus omnidirectional. The signals from a specific direction may be "well-coupled" or "poorly-coupled" to subsurface targets. The same situation arises with radio antennas. The antenna has to be rotated into the position of maximum sensitivity to the signal from a specific direction. However, in MT, because the signal is omnidirectional, and the orientation of subsurface targets generally unknown, for the best and most general result, it is necessary to use a measuring configuration that is omnidirectional, and thus independent of relative orientations between source-sensors-target.

The "plane electromagnetic waves" arriving at a given measuring area are refracted normal to the surface of the earth. The electromagnetic wave then propagates downward, normal to the surface, losing energy as it does so. The rate of energy loss in the vertical direction is exponential and depends simultaneously on two things: the frequency of the wave, and the electrical resistivity of the earth. The higher the frequency, and the more conductive the earth, the more rapid the attenuation. Thus, a signal at a specific frequency may penetrate quite deeply into the earth where the conductivity is low, or the penetration may be quite limited if the earth is quite conductive.

By Faraday's Law, the changing magnetic fields of the electromagnetic wave cause electric currents to flow in the earth (telluric currents). By measuring at the surface one component of the earth's magnetic field and a component of the earth's electric field at right angles to the magnetic field, it is possible to compute earth resistivity, albeit only in a single direction.

The resistivity of the rocks of the earth's crust varies over a range of more than ten million to one. For example, dense crystalline rocks, such as granite, with little or no pore space and little or no included fluids can have resistivity of approximately 100,000 ohm-m. By contrast, rocks laid down as sediments in ancient oceans frequently preserve in their pore spaces some of the ancient sea water, chemically modified to brines. Brines contain salts, and salty water conducts electricity quite well. Hence, marine sedimentary rocks usually have low resistivities, of a few ohm-m.

In other words, mapping the subsurface resistivity structure of the earth is a type of proxy subsurface geological mapping. Hydrocarbons are usually found in marine sedimentary rocks. Wherever these rocks are covered by denser, more resistive rocks, MT may be used to obtain an image of the subsurface resistivity structure which can be interpreted in terms of the gross rock structure. This is the basic idea behind the use of MT in oil and gas exploration.

Geological facies changes can be strongly correlated with resistivity changes. For example, a sandstone channel (more resistive) may grade into a shale (less resistive). A longshore bar with coarser sediments than its surroundings may preserve this porosity/permeability differential (with corresponding resistivity differential) throughout geologic time. Likewise, near-reef sediments tend to be more resistive then those more distant from the reef, because the sediments near the reef contain a higher proportion of more resistive carbonate fragments derived from the reef by wave action.

High-density networks of MT soundings (3-D MT) can be used to map lateral subsurface conductivity changes within inverted depth ranges that correspond reasonably closely to specific geological units or groups. Plan maps of such lateral resistivity changes (horizontal conductivity gradients) at various depths or in general the horizontal or vertical gradients of any measured or derived MT parameter can be used for a type of proxy subsurface geological mapping, providing information which may assist on locating subsurface oil and gas, geothermal, metal or ground water deposits.

Stratigraphic traps are commonly associated with porosity/permeability boundaries which exhibit significant resistivity changes, Dickey, P. H. and Hunt, J. M. "Geochemical and Hydrogeologic Methods of Prospecting for Stratigraphic Traps" pp. 136–167 in AAPG Memoir No. 16 "STRATIGRAPHIC OIL AND GAS FIELDS—

CLASSIFICATION, EXPLORATION METHODS AND CASE HISTORIES" 1972.

Most marine sedimentary rocks contain interstitial brines which exhibit strong variability in ion concentration (and thus strong variability in resistivity) due to variability in fresh water flushing. The saltier the brine, the lower its resistivity. Zones of high salt concentration are sometimes correlated with oil fields. Collins, A. G. "Oilfield Brines" pp. 139 ff in book "Developments in Petroleum Geology - 2" edited by G. D. Hobson, Applied Science Publishers, London, U.K., 1987 and Dickey, P. H. and Hunt, J. M. "Geochemical and Hydrogeologic Methods of Prospecting for Stratigraphic Traps" pp. 136–167 in AAPG Memoir No. 16 "Stratigraphic Oil and Gas Fields—Classification, Exploration Methods and Case Histories" 1972.

The frequently-reported "halo" effect above oil fields is variously ascribed to increased concentrations of metallic magnetic minerals which also have measurable resistivity differences.

Certain shallow heavy oil fields with thick associated brine sections are also suitable targets for resistivity mapping. Klein, J. H. "Spectral Induced Polarization Survey—David Field, Alberta, Canada" presented at 36th Annual Meeting of the Midwest Society of Exploration Geophysicists, Denver, Colo., USA Mar. 6–9, 1983.

It has also been reported that isolated deep reefs have associated geoelectric anomalies, seemingly because of differential compaction and perhaps some other characteristic of the reef structure which exerts a persistent influence on the subsequent deposition through geological time. Yungul, S. H. et al "Telluric anomalies associated with isolated reefs in the Midland Basin, Texas" GEOPHYSICS Vol. 38, June 1973 pp 545 ff.

Anticlinal crests usually exhibit lower resistivity than the surrounding rock because of tensional fractures. Similarly, synformal zones may exhibit higher resistivity due to compression. Overpressured zones are common in rapidly subsiding terranes and the overpressured zone may be a geological significant marker. Overpressured zones have lower resistivities than normally pressured zones due to the greater porosity. Fertl, W. H. "Abnormal Formation Pressures" Elsevier Publishing 1976.

Isolated sandstone lenses in shale formations are often filled with hydrocarbons and encased in overpressured, lower resistivity zones. Fertl, W. H. "Abnormal Formation Pressures" Elsevier Publishing 1976. The brine originally resident in the porous sand has been expelled into the surrounding shale, and oil generated in the surrounding shale has replaced the brine in the pore spaces of the sandstone.

In general any zone of higher porosity and/or permeability, especially in marine sedimentary rocks will exhibit lower resistivity than the surrounding rocks. If the resistivity of the interstitial fluids remains constant, then resistivity will decrease as porosity and permeability increase. Resistivity is especially sensitive to permeability, since zones of high permeability conduct electricity well. High permeability is an especially important property of a good reservoir. Normally, the marine sedimentary rocks can be imaged satisfactorily by seismic or sound waves, originating from man-made explosions or the controlled vibration of specialized machines. The sound waves are reflected from subsurface density boundaries, and the vertical motions caused by reflected waves are sensed at the surface by small, inexpensive units called geophones.

Modern seismic system typically measure the signal on hundreds or even thousands of geophones simultaneously and produce a detailed three dimensional image of the subsurface density structure.

The seismic technique usually produces images of quite high vertical and lateral resolution (a few meters or tens of meters). For this reason, seismic is favored for oil exploration over other geophysical techniques, such as gravity and magnetics, which although are relatively inexpensive, provide a low-resolution image.

MT falls in between, with higher resolution than gravity and magnetics, but significantly higher cost than seismic for comparable a real or linear coverage.

In certain cases, the seismic image may be poor. In locations having a very dense layer in the geological section, the seismic energy is reflected so strongly that little can be seen below these layers. Such dense layers are typically electrically resistive. The MT technique may be used to "see through" the resistive layers and obtain an image of the underlying conductive marine sediments, which seismic cannot see. Although the MT image is of lower resolution than the seismic image, it is still usefull where seismic is poor. This is the main way in which the multinational oil industry has used MT since its inception.

A 1995 MT system typically measures up to 16 input signals simultaneously. In western countries, an MT crew consists of 4 to 5 persons; crew number is usually greater where labor costs less. The equipment usually weighs approximately 300 kg, including a supply of 12 v batteries which are used to power the system. MT is mainly used at isolated points on a grid like or network structure. At each measuring point, three magnetic sensors are installed (to measure three orthogonal components of the magnetic field x-y-z and two wires about 100 m long are laid out in x-y directions and connected to the earth by special non-polarizing electrodes to measure the electric, or telluric field. The 16 channel system can be connected by cables to more than one such measuring site, as well as other outlying sites that measure only the electric field in x-y directions. The motive of the multiple channels is to increase productivity by measuring many channels simultaneously.

The magnetic sensors are immobilized by installing them in shallow trenches; the electric field wires are also restrained from moving as much as possible, since motion of the sensors creates noise signals. The goal is to measure changes of the electric and magnetic fields with stationary sensors. The sensors are connected to an auxiliary unit, called "sensor processor" or "signal conditioner", which filters and amplifies the signals. The amplified signals are then transmitted via a long cable to a "receiver" unit, which contains additional filters and amplifiers. Next the signal is digitized and then stored in memory. The data acquisition proceeds for typically 8 to 16 hours, sometimes longer, in noisy environments, and frequently the equipment operates unattended overnight. The series of digital samples from each of the input channels collected over the entire data acquisition time is termed a "time series".

While the receiver usually is capable of real-time processing of the data, it is usual to transfer the time series data to a central computer for more detailed processing.

This is especially important in very noisy environments. The magnetic and electric signals utilized by the MT technique are quite small. The noise arising from even small motions of the sensors can introduce error into the calculations. Even more serious, modern industrial civilization generates a large amount of electromagnetic signals at an extremely wide range of frequencies, including the low sub-audio frequencies used by MT.

By recording the MT signal simultaneously at two separate locations, some distance apart, it is possible to reduce the noise by processing the data from both locations in a special way. This technique is called "remote reference". The data from each station serves as a reference to the other. Remote reference is possible because the MT signal usually originates some thousands of kilometers from the measuring point and is thus very similar over a distance of many kilometers. The man-made noise or sensor noise usually is correlated over a much shorter distance. Hence the magnetic field is correlated at the two separate sites, whereas the noise is uncorrelated. Depending on the "radius of correlation" of the noise, the two sites may need to be separated by a relatively large distance, perhaps 100 km. In this case, the problem of synchronizing the data acquisition at the two locations has been solved by providing each recording station with a very precise quartz oscillator or "precision clock".

Continuous profiling uses many contiguous in-line individual measurements of the electric field and combines with simultaneous measurements of at least 2 orthogonal horizontal components of the magnetic field provides resistivity soundings at all electric field measuring points. The measuring line is kept as straight as possible. The contiguous electric field measurements can be summed together in suitably weighted fashion, and in suitably increasing quantities (i.e. increasing lengths) to provide the basis of a spatial filtering technique which smooths out the effect of localized surface resistivity variations. Such near-surface resistivity inhomogeneities can distort the electric field measurement, causing errors in the calculation of the earth's resistivity. This phenomenon is known as static shift and it is a serious problem in interpretation of MT data. The continuous profiling technique is described in U.S. Pat. Nos. 4,591,791; 4,757,262; and 4,835,473 as well as the article "Principles of spatial surface electric field filtering in magnetotellurics: Electromagnetic array profiling (EMAP, by C. Torres-Verdin and F. X. Bostick, GEOPHYSICS Vol. 57, pp. 603–622, 1992. On page 608 of this article it is clearly brought out that simultaneous synchronized data acquisition at a very large number of MT measuring stations is beyond the then state of the art.

Continuous profiling and spatial filtering (i.e. smoothing) was originally promoted as a solution for the problem of static shift. However, like all smoothing techniques, it distributes error rather than removing it. Hence it cannot remove static shift. However, it can smooth its effects and thus provide a subsurface conductivity image with less local variation which is considered to be easier to interpret. In addition, the continuous image is easier for the human eye to visualize and interpret and provides higher spatial resolution than isolated point soundings. These advantages have led to an increase in the use of continuous MT profiling in recent years.

A little-mentioned disadvantage of the continuous profiling technique is that the in-line measurement of a single component of the electric field permits of only a scalar interpretation at the single-component electric field measuring points. The disadvantages of the scalar measurement are well known to practitioners of the art.

A more serious disadvantage of the continuous profiling technique is that it imposes an electric field measurement length of typically 200 m which is absolutely required by the spatial filtering algorithm which characterizes the technique, in order to define the near-surface layers, but which is actually unnecessary for lateral resolution of deeper targets. In other words, the continuous profiling "solution" actually creates extra cost and guarantees a practical limitation to the application in the field. Because the MT signal is omnidirectional, each MT sounding point has a lateral zone of sensitivity which may be likened to an inverted, truncated cone. The continuous profiling technique must "oversample" the electric field. Oversampling leads to higher cost, as well as logistic penalties when it is difficult to maintain the continuity of the line.

The continuous profiling technique requires continuous, contiguous in-line measurements of the electric field. As a result, the technique is vulnerable to loss of one or more points. This can arise from several causes which are quite common in real-world exploration.

Moreover, the continuous profiling technique is poorly adapted to wide-area reconnaissance. For example, it is a typical feature of oil and gas or other resource exploration license blocks that significant areas of the block have to be relinquished after each stage of exploration.

SUMMARY OF THE INVENTION

The disadvantages of the prior art may be overcome by providing an MT system having a parallel data acquisition architecture and methodology to dramatically reduce the cost of MT data acquisition.

It is desirable to provide an MT data acquisition based on parallel, satellite-synchronized data acquisition using an unlimited number of independent, optimized, low-cost, rugged, lightweight digital sensor units, each of which has a large amount of onboard memory, and each of which measures the fluctuations of earth's natural electric or magnetic fields.

According to one aspect of the invention, there is provided a method of data acquisition for geophysical surveys. The method includes the steps of providing a least one magnetic sensor unit for sensing and recording magnetic field fluctuations; providing a plurality of electric sensor units for sensing and recording electric currents induced by the magnetic field fluctuations; receiving a satellite based timing signal and responsively synchronizing and fixing a position for each of the plurality of electric sensor units and the at least one magnetic sensor unit; and synchronously recording the positions, the magnetic field fluctuations and the electric currents for downloading for processing.

According to another aspect of the invention, there is provided a sensor and recording unit. The unit has a satellite receiver for receiving and processing satellite based timing signals for fixing a position of said unit and synchronizing said unit with another like unit; a data acquisition system receives signals from a plurality of sensors and converts the signals to corresponding digital data; electronic memory stores the corresponding digital data; a processor controls the data acquisition system and the electronic memory for effecting periodic collection and converting of the signals and the storage and downloading of the data.

DESCRIPTION OF THE DRAWINGS

Preferred embodiments of the present invention will now be described, by way of example only, with reference to the attached Figures, wherein.

DESCRIPTION OF THE INVENTION

The present invention implements an innovative MT data acquisition architecture and methodology to dramatically reduce the cost of MT data acquisition, thereby solving the fundamental problem of high cost which has until now prevented MT from being more widely used.

Figure 1:
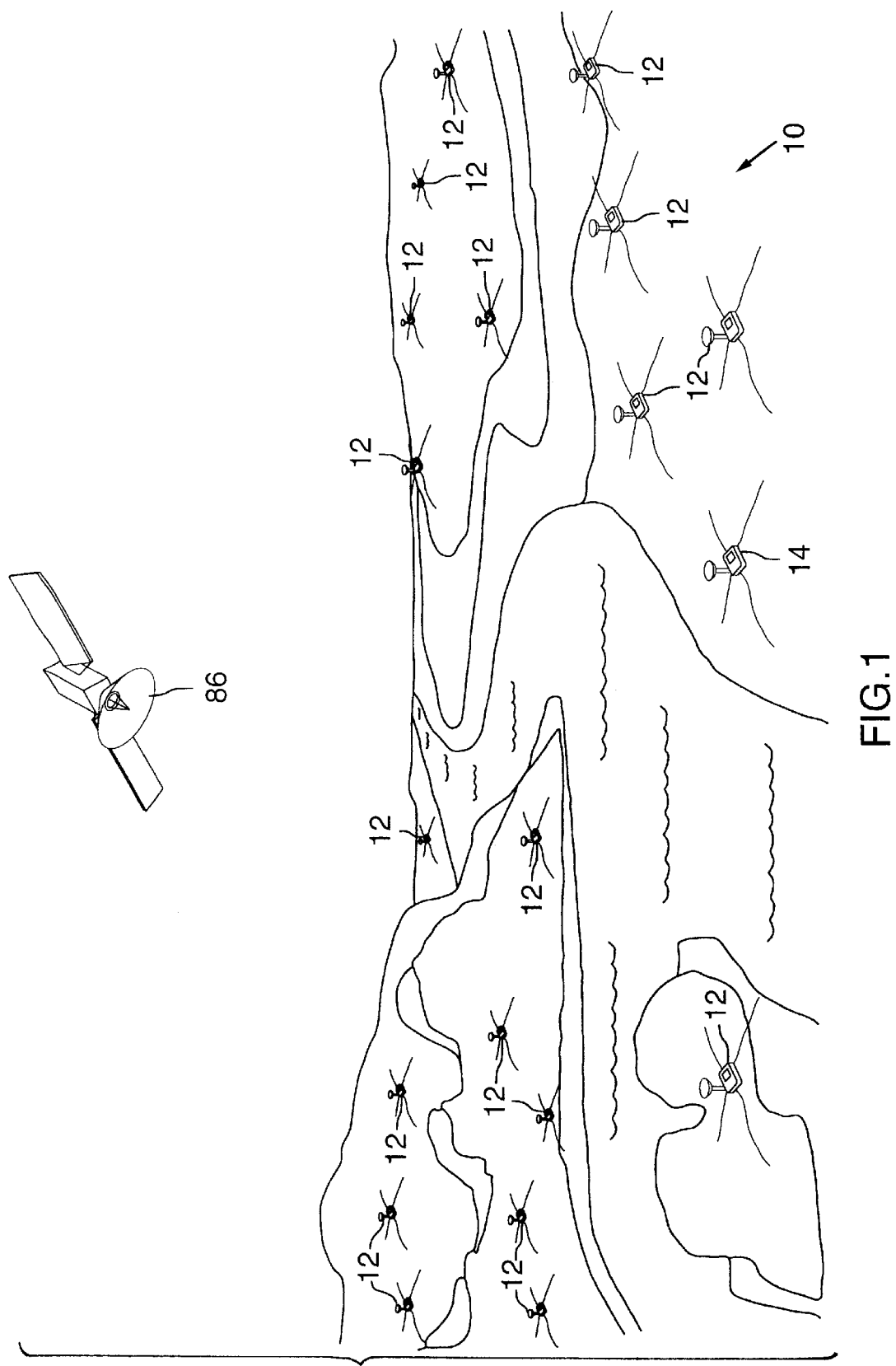
FIG. 1 is a perspective view of the system of the present invention as installed in the field.
Figure 2:
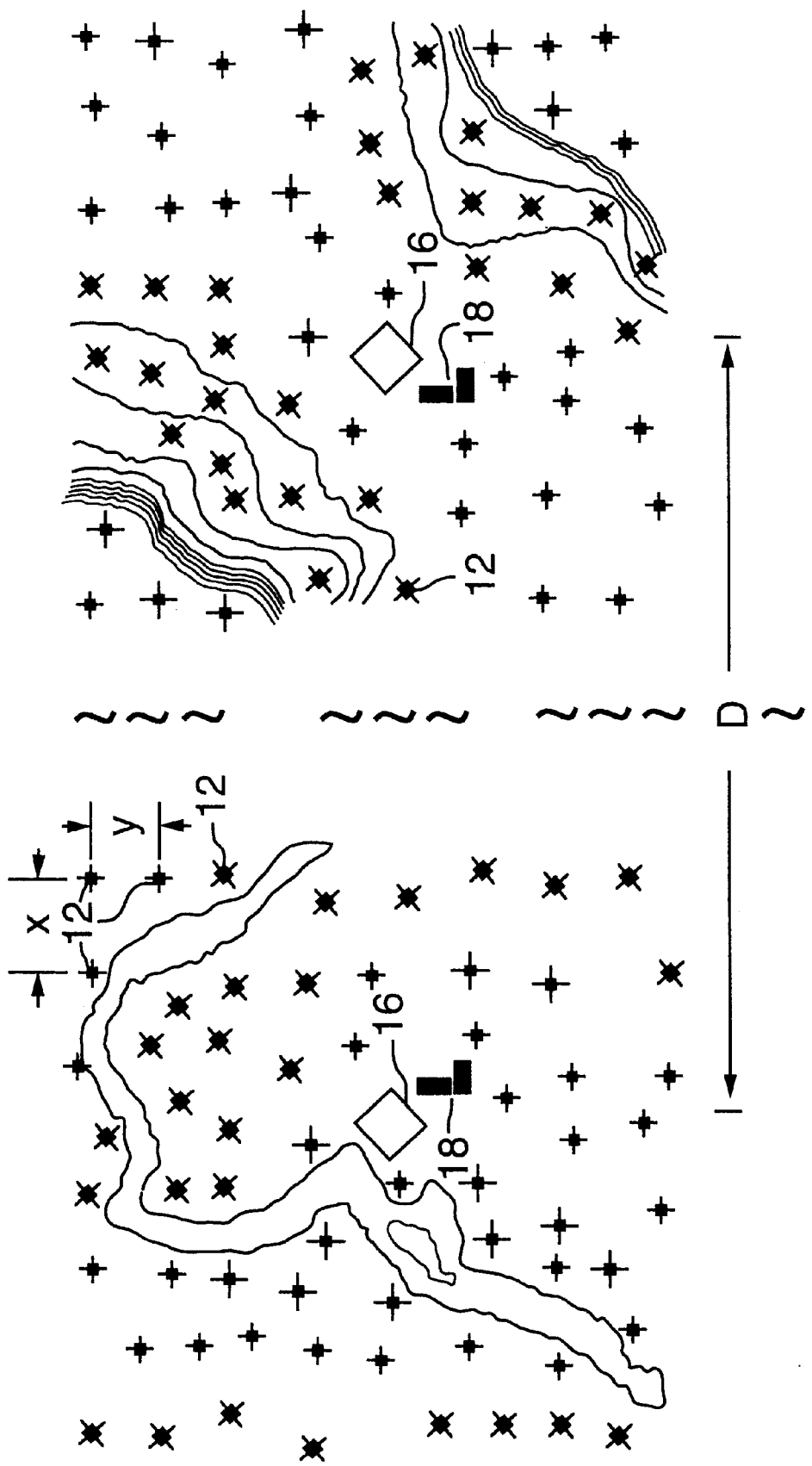
FIG. 2 is a plan view of the system of the present invention installed in the field.

Referring to FIGS. 1 and 2, the system 10 of the present invention comprises a series of electrical sensor units or stations 12 and a magnetic sensor unit or stations 14 which are located at various locations about an area to be surveyed. As illustrated, the system 10 can be used in any surface geography, including relatively flat areas, across rivers and on mountains. As is discussed later, the system 10 is capable of being used in any terrain.

The system 10 may comprise one or more suitable 5-component recording stations 16 which combines a sensor unit 12 with a sensor unit 14. The sensor unit 12 is equipped for electric field measurement. Sensor unit 14 is equipped for magnetic field measurements. One or more of the 5-component stations 16 may be fixed at one location for the duration of the survey in a suitable low-noise environment (fixed quiet remote reference) or the 5-component stations 16 may move with their associated groups of sensor units 12 (moving remote reference).

The sensor units 12 are installed at spacing and locations determined by the user. Preferably, the sensor units 12 can be spaced at any suitable x and y interval of between 200 m to several kilometers. The 5-component stations 16 can be spaced from 5 to 100 kilometers apart. Optionally, a local reference 18 comprising a two dimensional magnetic recording station may be installed near the 5-component stations 16.

Figure 3:
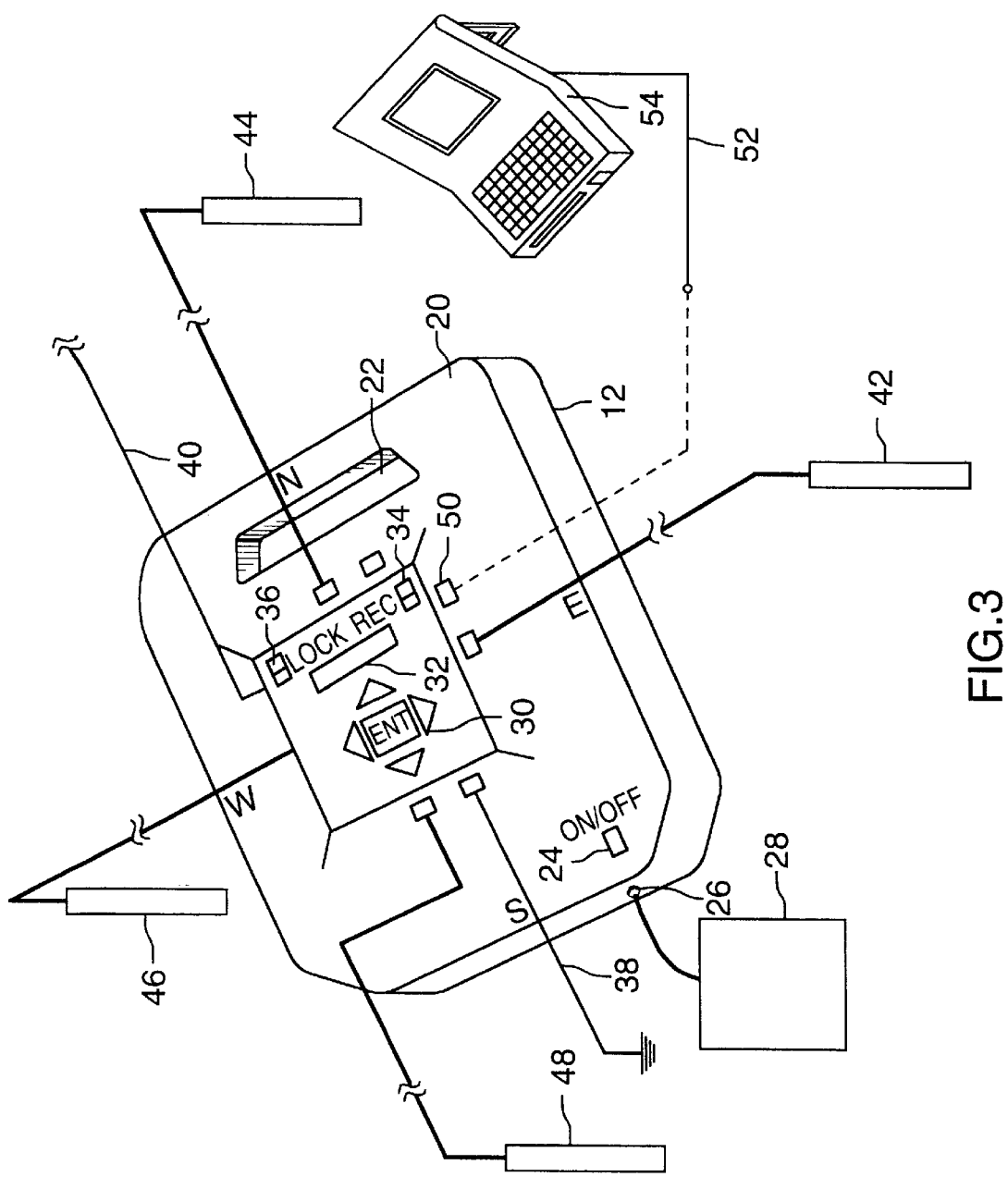
FIG. 3 is a perspective view of a recording station and portable computer of the present invention.

Referring to FIGS. 3, each sensor unit 12 has an outer waterproof housing 20 having a handle 22 for carrying the unit. The sensor unit 12 has an on/off switch 24, a jack 26 for receiving a connector for an external power source 28. Power source 28 could include a solar panel or an extra battery. The housing 20 optionally may have a keypad 30 for inputting user input, a display 32 and status signals 34 and 36. Housing 22 has an input for receiving ground line 38 and a GPS antenna 40. The face of the housing 22 has indicia for indicating the preferred compass orientation of the sensor unit 12. The compass letters "N", "S", "E" and "W" are used to indicate the magnetic direction of each edge of the unit 12. The sensor unit 12 has at least four connector inputs, one for receiving signals from each of the electric field sensors 42, 44, 46, 48. Additionally, sensor unit 12 has a computer serial or parallel port 50 for receiving cable 52 which connects computer 54 serially or in parallel.

Figure 4:
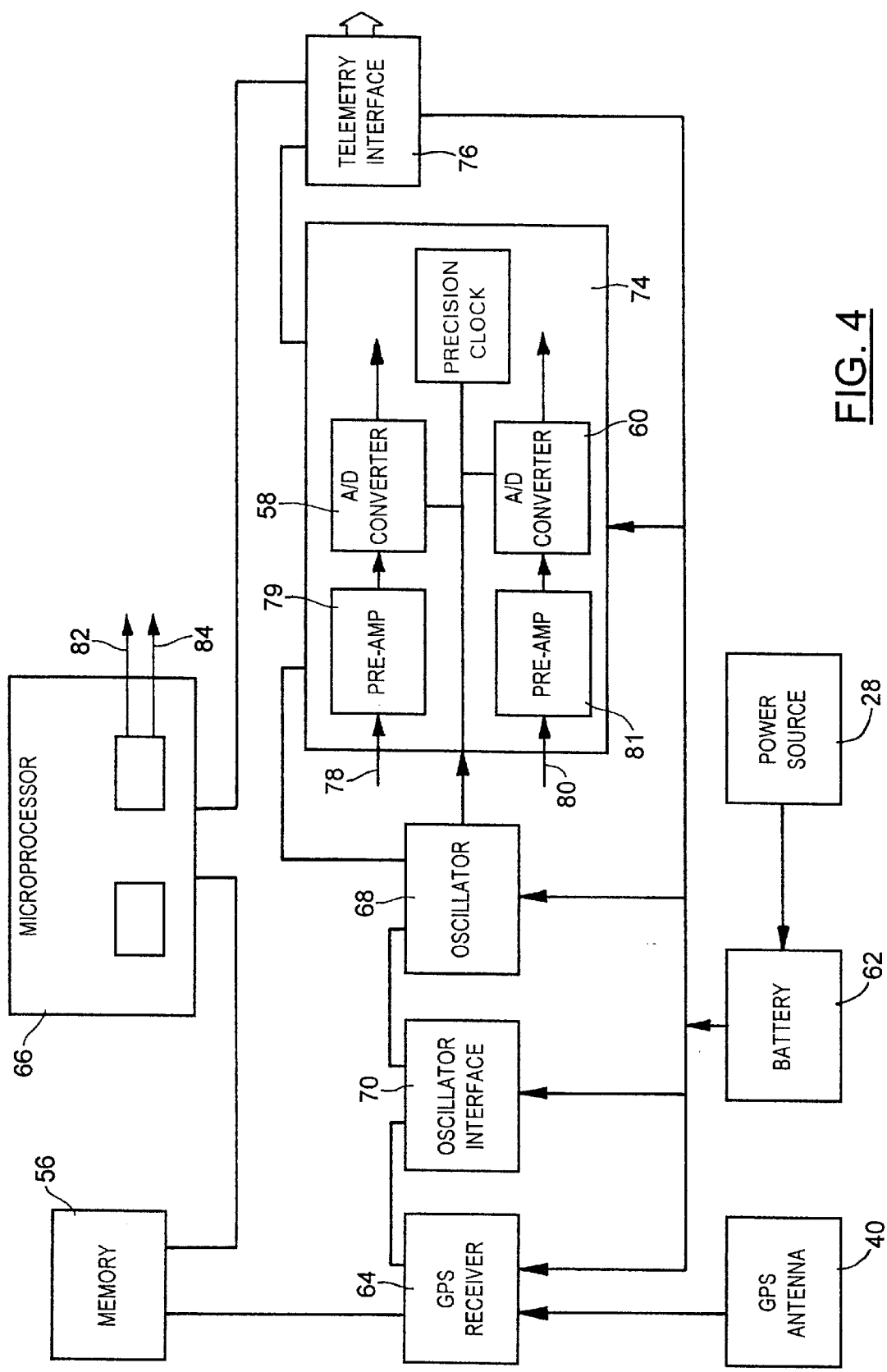
FIG. 4 is block schematic diagram of the recording station of the present invention.

Referring to FIG. 4, the schematic of sensor unit 12 is illustrated. Sensor unit 12 has solid state memory 56, analog-to-digital converters 58 and 60 mounted on a data acquisition board 74, battery 62, GPS antenna 40 and GPS receiver 64, a low-power consumption microprocessor 66, an oven controlled stable oscillator 68, an oscillator interface 70 and digital telemetry interface 76. All of the components of sensor unit 12 are built around a standard computer bus system, preferably a PC/104 bus.

Each sensor unit 12 has connectors inputs 78 and 80 for electric sensors, and, at least two ports, a parallel port 82 and a serial port 84.

The memory 56 is preferably a 40 Mb of memory, but is preferably expandable to 100 Mb. Sufficient memory for a typical recording spanning 10 to 20 hours is about 40 Mb. This amount of memory incorporated in each sensor unit 12 is not restricted.

Processor 66 is preferably a low power consumption processor and will have programming for automatically performing a data acquisition procedure at predetermined intervals. Upon powering up several minutes in advance of the predetermined time, the processor 66 will power up the GPS receiver 64 and the oven controlled crystal oscillator 68. The oscillator interface 70 compares the frequency of the oscillator 68 with that of the GPS receiver 64. When the processor 66 determines that the GPS receiver 64 has locked onto at least four signals from four orbiting GPS satellites 86, the processor 66 causes the oscillator 68 to adjust its frequency to be in agreement with the GPS time base. This process takes several minutes to accomplish. When completed, the oscillator 68 maintains the time base to a high level of accuracy, even if the GPS signals are lost for up to an hour.

The on-board GPS receiver 64 is a conventional GPS receiver, preferably with differential capabilities, which provides the exact location of the sensor unit when the data is retrieved. The exact x-y-z location can then be presented to contouring and plotting programs which transform data from random locations into an internal format of interpolated, regularly-gridded data for calculation purposes, while still retaining the original position information.

More importantly, the GPS receiver 64 in each sensor 12 provides a time reference to synchronize the data acquisition. GPS is an system of satellites, each of which broadcasts a coded timing pulse. By calculating the time shift between pulses from different satellites, the position of the receiving unit can be accurately determined. The sensor receives the satellite broadcast signals and processes the signal to establish a precision time reference for the data acquisition. Since all sensors will receive the same GPS broadcasts, all of the sensors may be synchronized to the same precise time reference.

The processor preforms a self-calibration operation which measures the response of the data acquisition board 74. Calibration results are stored in memory 56 and are automatically applied during data acquisition.

At the predetermined time, the processor 66 begins to transfer acquired time series from the data acquisition board 74 to the memory 56. The acquisition process continues for a predetermined length of time. When complete, the data is downloadable to a portable computer 54. Signals from the sensors 42, 44, 46 and 48 are transmitted to the sensor unit 12. The signals are pre-amplified in pre-amps 79 and 81 on data acquisition board 74. The signals are then converted from analog to digital in converters 58 and 60. The digital signals are then transferred to memory 56. The digital signals or "time series" are time tagged at suitable intervals of approximately one minute.

Figure 5A:
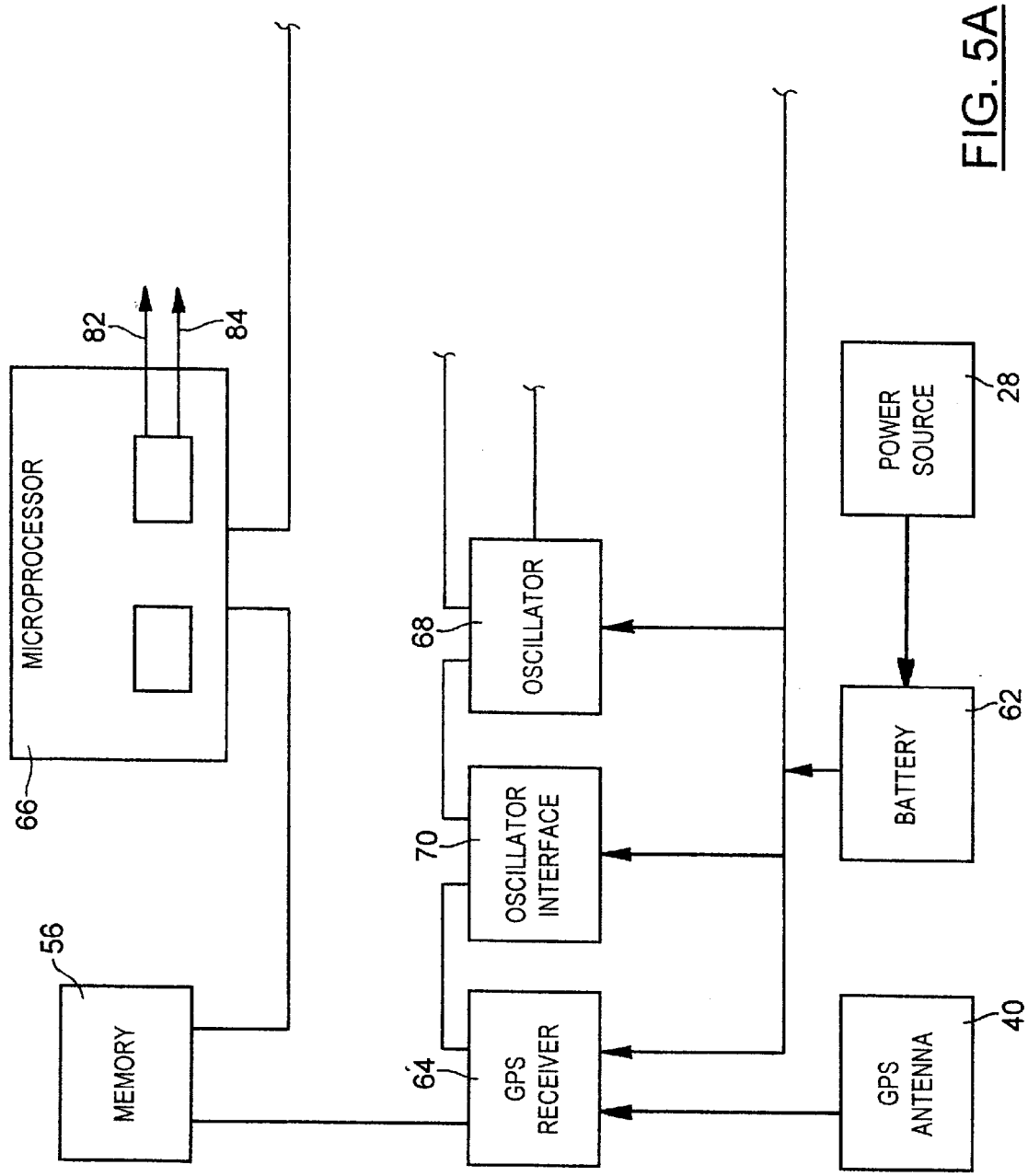
FIGS. 5A and 5B together comprise a block schematic diagram of the combined electric and magnetic recording station of the present invention.
Figure 5B:
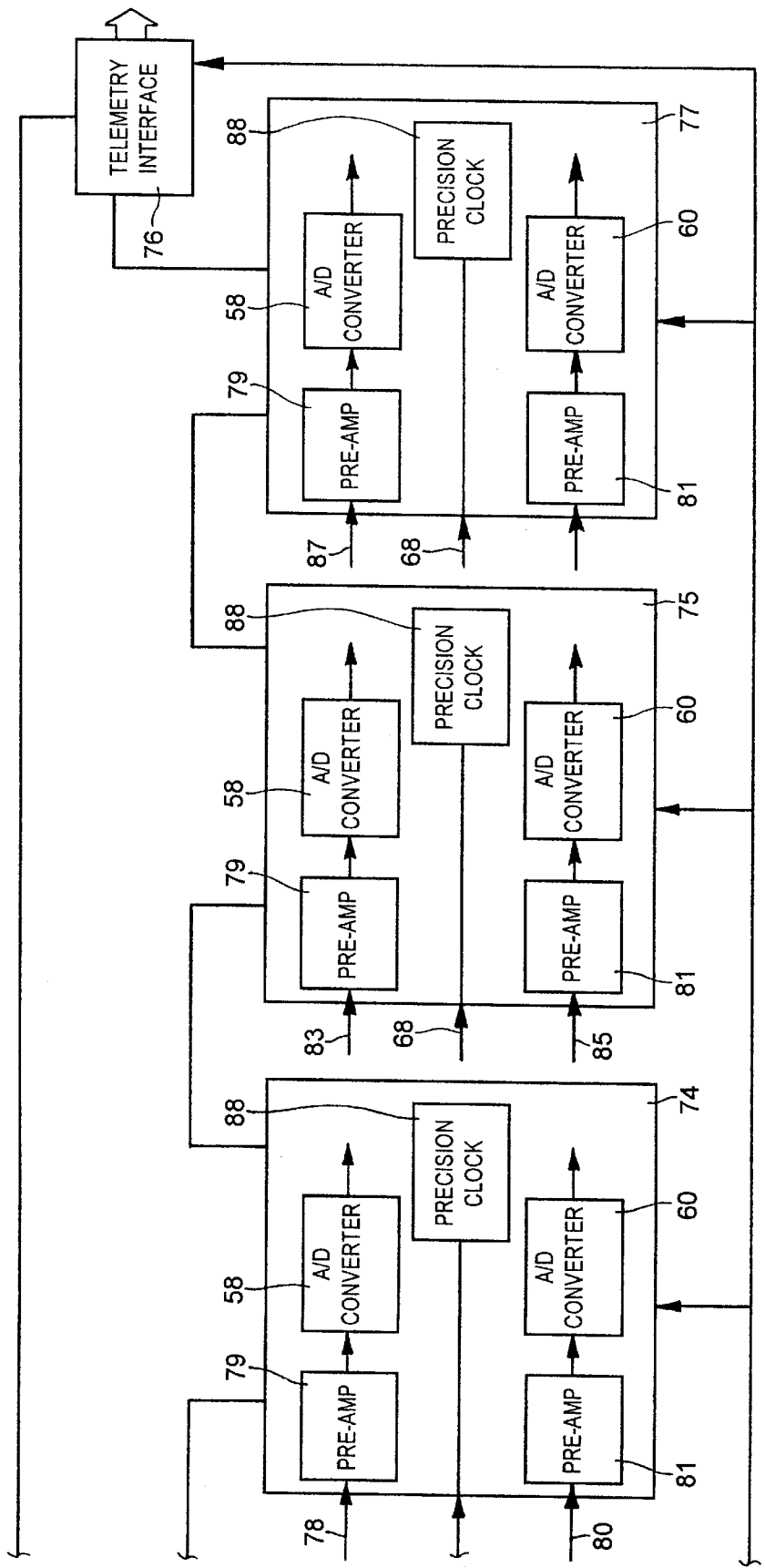

The sensor units 14 and 16 are identical to the sensor 12 except that the sensor unit 14 will have two data acquisition boards 74 to acquire three orthogonal components of magnetic field and that sensor unit 16 will have three data acquisition boards 74, 75, 77 as illustrated in FIGS. 5A, 5B to acquire two orthogonal components of electrical current and three orthogonal components of magnetic field. The additional data acquisition boards 74 provides connector inputs 83, 85 and 87 for magnetic sensor inputs. Sensor units 14 and reference units 18 are the same as sensor units 12 except that the sensors 42, 44, 46 and 48 are replaced by magnetic sensors, which are buried in the earth's surface in a manner well known in the art of MT.

The magnetic field changes slowly in space compared to the electric field. Thus, a single measurement from station 14 can be combined with a large number of simultaneous electrical measurements made and recorded by sensor units 12 to provide many additional MT sounding points. This approach is especially suited to network coverage of very large areas, with rugged topography, rivers, and/or many landholdings.

The system 10 of the present invention uses simultaneous satellite-synchronized MT data acquisition by using a large number of independent integrated digital recording units, most of which measure either one or two components of the earth's natural electric field. A lesser number of units is used to measure one to three components of the earths' magnetic field.

The present invention deploys the sensor units 12 at any suitable spatial density, in any suitable location, by any practicable means, and installed/retrieved by boat or helicopter if ground access is difficult or impractical.

Multiple 5-component stations 16 can provide multiple mutual remote reference, including "far remote reference" at a distance of 100 km from the main recording area. The labor to install a sensor unit 12 site is small compared to the labor for installing a full 5-component 16 site, and the equipment costs significantly less.

Ruggedized portable PC computers 54 are carried by members of the crew to each sensor site and used to check the data, transfer and temporarily archive time series data acquired at the sensor unit 12 sites, and carry the data to the central processing site, where it is processed on a suitable computer and displayed as the usual plots, 3-D visualisations, various plan maps, and arbitrary sections. Although the sensor units 12 can optionally be linked by cable or radio telemetry or satellite uplink, for real-time data concentration, the preferred method of operation, especially in rugged terrain, is independent satellite-synchronized operation of the sensor units 12, with data transfer by ruggedized PC 54.

Productivity is limited only by the practical number of sensor unit 12 which can be deployed and processed continuously. For example, a crew of 15 persons (operator and 14 field workers) with 28 sensor units 12 might acquire 30 MT soundings per day operating only one 13-hour shift.

If any sensor unit 12 units fail during the data acquisition, the site can be re-sounded after replacing the defective unit. In other words, the technique is robust against loss of individual sites.

A single 5-component MT measuring point serves a relatively large number of associated measuring points which measure only two orthogonal components of the earth's electric field. The "main station" or "base camp" records three components of the magnetic field, and two components of the electric field. It may optionally also record, at a nearby location (typically a few hundred meters distant) two additional horizontal components of the magnetic field, which two components serve as "local" reference for the main station.

The sensor units 12 may be distributed in any suitable pattern, at any suitable location, at any suitable spacing, with measuring wires of any suitable lengths, and in any suitable orientation, which is necessary and desirable for optimal adaptation to the local site topography and geology.

Moreover, the sensor units 12 may be left emplaced for as long as possible in order to achieve higher data quality through increased recording time.

Since many MT surveys are carried out in remote areas with poor or no access by road, it is essential to reduce weight so that the equipment for a single sensor 12 site can be carried by one or two persons.

The sensors are deployed at intersections of a 2-D surface network; the third dimension (depth) is obtained by proxy: MT measures frequency-dependent resistivity across a wide range of frequencies and converts the original frequency measurement to a depth-based image using techniques called "inversions", which are always subject to ambiguity.

The 3-D MT data sets thus collected can be routinely integrated and interpreted with 3-D seismic data by adapting existing specialized computer workstations and programs which are already developed for 3-D seismic interpretation.

Although the preferred embodiment of the invention is physically independent digital sensor units, with data transfer to the central recording site through the medium of a ruggedized PC, there is no limitation or restriction on the means of transferring data from the remote units to the central recording unit. Where feasible, the sites may be connected by cable for real-time or near real-time synchronization or data transfer to the central recording unit, or, where feasible, digital radio telemetry 76 may be used. If practical, direct communication, such as a satellite uplink, may also be used.

The digital MT data collected by each of the sensor units 12, 14 and 16 units can be formatted or reformatted in such a way that it is compatible with or emulates the data storage format and satisfies the data communications protocols of existing 3-D seismic systems. These systems normally employ a large number of "remote seismic units", each of which repeatedly acquires and stores a discontinuous time series (the seismic trace) of a few hundred to several thousand data samples, which are transmitted either in real-time or pseudo-real time to the central recording unit by digital cable or radio telemetry. Although the MT time series are typically hundreds or thousands of times longer than the seismic time series, by emulating the seismic data format, and implementing software compatible with the seismic data communication protocols, the digitized MT data can either be transferred in digital form into standard seismic remote units, or the sensor units 12, 14 and 16 can be directly connected to the seismic cable or radio telemetry network without utilizing the seismic remote units.

The present invention can optionally "piggyback" on the highly-developed cable and radio-telemetry apparatus and technique already in use in 3-D seismic systems. The MT survey can be conceptualized as a "subscriber" who uses the "common carrier" hardware and software of the 3-D seismic system.

The MT survey can be carried out using the seismic telemetry apparatus, independently of or in combination with seismic data acquisition.

The data format and other characteristics of the data collected by the sensor units 12 is or can be made compatible with the data obtained from some existing MT systems. Thus, by adding a number of sensor units 12 as accessories to existing systems, and upgrading the synchronization mechanism of the existing systems to GPS synchronization, the productivity of the existing systems can be significantly increased, and the significant capital investment represented by the existing systems is preserved and even enhanced.

The MT signal is random, and in the low audio range. Each channel must be digitized continuously at a rate of perhaps 1,500 samples per second. In order to ensure that the data is analyzed properly, it is essential for the corresponding samples on all channels to be taken simultaneously. At higher MT frequencies, a small error in timing can actually be a significant portion of a whole cycle. Thus timing errors can lead to significant errors in calculation. In a cable-linked system, all sampling is done at the centralized recording unit, using a single time reference. When the MT sites are physically separated by large distances, the timing reference is derived from pre-synchronized "precision clock" accessory units 88, which are in the present state of the art periodically re-synchronized during the survey by being brought physically together. The invention provides a means of achieving ongoing synchronization of multiple sensor units without the need of bringing the units physically together.

The recording time is typically several hours (up to 16 or even 24 hours) at each station. It can be appreciated that the amount of data in an MT "time series" is relatively large, and that real-time telemetry and archiving such large amounts of data would require a system with at least as great a technical capability as a seismic telemetry system.

The a-to-d conversion and memory functions are decentralized away from the central recording unit to the "digital sensor unit" itself. Each sensor becomes an independent (although synchronized) recording unit. The onboard memory, A-to-D conversion, and other technical requirements become manageable. 40 Mb to 100 Mb of solid state memory suffices for a typical recording spanning about 10 to 20 hours.

The digital sensor unit can optionally utilize recently developed 24, 22 or 18-bit analog to digital converters to decrease the amount and cost of front-end analog circuitry formerly required and to increase the dynamic range of the equipment. The frequencies normally utilized in MT cover the range of 400 Hz to $\frac{1}{2000}$ Hz. These frequencies lie well within the optimal functioning range of 24 bit ADC units. The increase in dynamic range provides advantages such as decrease in the number of filters required and ability to use longer electric field dipoles. However, the invention is not restricted to the ADC converters mentioned, since as ADC technology advances, the digital sensor units can be upgraded to track ADC evolution.

It is often necessary to orient the orthogonal horizontal MT magnetic and electric sensors perpendicular and parallel to local topographic and geologic features. In order to minimize the influence of such features on the measured data, or to orient the sensors in such a way as to minimize or balance noise, it is desirable to provide the field crew with flexibility of sensor orientation. Since the magnetic field is measured simultaneously in two directions, it is possible to mathematically rotate the measured magnetic field axes to any axes actually occupied by the electric field sensors. In the prevailing state of the art this is accomplished by measuring the 2 or 3 components of the magnetic field at all isolated MT points (with at most 4 associated sensor units 12 stations), and by orienting the magnetic sensors in the same directions as the electric sensors.

Although the preferred embodiment of the invention is for use as an optimized MT data acquisition system, in other embodiments the remote units can be configured in an optimal way for other electromagnetic geophysical techniques. The applicability of the invention is not restricted to MT, but it can be applied in general to any electromagnetic geophysical technique which requires measurement of electric and/or magnetic fields. The various techniques, including but not limited to VLF (Very Low Frequency), ELF (Extra Low Frequency), induced polarization (IP), AMT (Audio Frequency Magnetotellurics) CSAMT (Controlled Source AMT), Transient Electromagnetics (known as TEM, TDEM, or Transient EM); FDEM (Frequency Domain EM) each have their own optimal requirements for A-to-D conversion rate, frequency range, length of time series, onboard memory, etc, and the invention can be configured or adapted suitably for each of these techniques.

The sensor units can be independently emplaced, providing maximum logistic flexibility. This means among other things that the density of recording units can be different in different parts of the network, depending on the perceived requirements for lateral resolution. It also means that the first iteration of exploration can be done with only sensor units 12; then, if the first iteration of data acquisition and in-field interpretation shows that greater site density of sensor units 12 is warranted in certain areas, more sensor units 12 can be deployed there in the next iteration, and so on, during a single visit to the field area. Likewise, additional sensor units 14 may be deployed as indicated in the successive iterations of exploration.

Note that while the use of only one measuring point for the magnetic field for a large number of associated sensor units 12 may introduce some error into the calculation of the resistivity at each sensor unit 12 site, compared to the resistivity which would be obtained if the magnetic field were measured at every sensor unit 12 site, the error is not expected to be large because of the known slow spatial variation of the magnetic field.

Since earth resistivity cannot be calculated by measurement of the MT electric field alone, it is necessary to measure simultaneously the magnetic field also (usually in 3 components x-y-z) at one location at least. Earth resistivity is calculated in MT as a frequency-dependent ratio of the square of the measured electric and magnetic fields. The MT measurement is sometimes described by stating that the information (i.e. spatially changing values) lies mainly in the electric field, whereas the slowly spatially changing magnetic field is essentially a scaling factor.

While the preferred embodiment of the invention foresees deployment of one sensor unit 14, measuring 3 components of the magnetic field, for each relatively large group of associated sensor units 12, the invention is not restricted to this configuration. The digital sensor units may be combined in any proportion or configuration that the user deems suitable, practical, or theoretically justified, including without limit two such groups recording simultaneously. A second or third sensor unit 16 unit situated some tens of km distant may serve as a fixed "far remote reference site".

Installation time for the horizontal magnetic sensors usually is 2 to 3 times longer than the installation time for the horizontal (x-y) electric field sensors. Installation time for the vertical magnetic field sensor may be even greater since a hole approx. 80 cm deep must be excavated, which is a difficult task in rocky or hard ground. One solution to this problem is to use a large multiturn loop of wire called an "airloop" which can simply be laid out on the surface, eliminating the need to excavate a hole for the vertical sensor. However, the airloop is difficult to emplace in rough topography, since it requires a near-planar site approx. 30 m square. Also, it is impractical or in heavily forested or bush areas, since the loop cannot be severed for technical reasons. Nevertheless, the airloop may be deployed with the invention as required, within its own limitations.

Although the disclosure describes and illustrates the preferred embodiments of the invention, it is understood that the invention is not limited to these particular embodiments.

Many variations and modifications will now occur to those skilled in the art.

I claim:

1. A method of data acquisition for geophysical surveys, comprising the steps of:

providing in a survey area at least one magnetic field sensor unit for sensing and recording geomagnetic field fluctuations, said at least one magnetic sensor unit including at least three magnetic field sensors positioned for sensing three orthogonal components of the geomagnetic field;

providing in the survey area a plurality of electric field sensor units for sensing and recording electric fields induced by said geomagnetic field fluctuations, the electric field sensors being spaced apart from the magnetic field sensor and from each other, each said electric field sensor unit including at least two sensors positioned for sensing two orthogonal components of the electric field;

receiving at the sensor units a satellite based timing signal and responsively synchronizing each of said sensor units;

synchronously recording with said timing signal said geomagnetic field fluctuations and said electric fields; and repeating the sensor unit providing steps and the signal receiving step in accordance with the recorded fields.

2. A method as claimed in claim 1 wherein said method includes the step of fixing a position of each of the plurality of electric sensor units and said at least one magnetic sensor unit.

3. A method as claimed in claim 2 wherein said method further comprises a step of:

downloading said recordings of said magnetic field fluctuations and said electric currents for remote processing.

4. A method as claimed in claim 3 wherein said method includes the step of providing each of said plurality of electric sensor units and said at least one magnetic sensor unit with sufficient memory for recording said positions, said magnetic field fluctuations and said electric currents over a period of time.

5. A method as claimed in claim 4 wherein said method includes the step of providing a portable computer for connecting to each of said plurality of electric sensor units and said at least one magnetic sensor unit to effect said step of downloading.

6. A method as claimed in claim 5 wherein said method further includes an initial step of providing a combined magnetic sensor unit and electric sensor unit at a location remote from said plurality of electric sensor units and said at least one magnetic sensor unit.

7. A sensor and recording unit comprising:

a satellite receiver for receiving and processing satellite based timing signals;

at least two orthogonally positioned sensors for sensing orthogonal components of at least one of geomagnetic field fluctuations and electric fields induced by the geomagnetic field fluctuations;

a data acquisition means coupled to the satellite receiver and the sensors for receiving samples of the respective fields in synchronism with the satellite based timing signal, the data acquisition means including a local oscillator for maintaining said synchronism in absence of the satellite based timing signal; and electronic storage means in communication with the data acquisition means for storing said field samples.

8. A sensor and recording unit as claimed in claim 7, wherein said orthogonally positioned sensors comprise three orthogonally positioned magnetic field sensors and two orthogonally positioned electric field sensors.

9. A sensor and recording unit as claimed in claim 8 wherein said data acquisition means includes a digital telemetry interface for remotely downloading said stored samples.

10. A geophysical survey system, comprising:

at least one magnetic field sensor unit disposed in a survey area for sensing and recording geomagnetic field fluctuations, said at least one magnetic sensor unit including at least three magnetic field sensors positioned for sensing three orthogonal components of the geomagnetic field, a magnetic field sensor antenna for receiving a satellite based timing signal and a magnetic field processor coupled to the magnetic field sensors and the magnetic field sensor antenna for sampling the geomagnetic field in synchronism with the satellite based timing signal;

a plurality of electric field sensor units disposed in the survey area for sensing and recording electric fields induced by said geomagnetic field fluctuations, the electric field sensors being spaced apart from the magnetic field sensor and from each other, each said electric field sensor unit including at least two sensors positioned for sensing two orthogonal components of the electric field, an electric field sensor antenna for receiving the satellite based timing signal, and an electric field processor coupled to the electric field sensors and the electric field sensor antenna for sampling the electric fields in synchronism with the geomagnetic field samples; and a central data processing system in communication with the field sensor units for providing a geophysical survey of the survey area in accordance with the geomagnetic and electric field samples.

11. The geophysical survey system according to claim 10, further comprising at least one combination field sensor unit disposed in the survey area for simultaneously recording geomagnetic field fluctuations and the electric fields induced by said geomagnetic field fluctuations, said combination field sensor unit including at least three magnetic field sensors positioned for sensing the three orthogonal components of the geomagnetic field, at least two electric field sensors positioned for sensing two orthogonal components of the electric field, a combination unit antenna for receiving a satellite based timing signal, and a combination field processor coupled to the combination unit magnetic field sensors, the combination unit electric field sensors and the combination unit antenna for sampling the geomagnetic field and the electric field in synchronism with the satellite based timing signal.

12. The geophysical survey system according to claim 10, wherein at least one of the field processors include a local oscillator for maintaining said respective synchronism in absence of the satellite based timing signal.

* * * * *